United States Patent
Pinard

(10) Patent No.: US 8,309,004 B2
(45) Date of Patent: Nov. 13, 2012

(54) METHOD FOR PRODUCING A COMPOSITE PART

(75) Inventor: Fabrice Pinard, Paris (FR)

(73) Assignee: USINOR, Puteaux (FR)

( * ) Notice: Subject to any disclaimer, the term of this patent is extended or adjusted under 35 U.S.C. 154(b) by 201 days.

(21) Appl. No.: 10/589,577

(22) PCT Filed: Feb. 17, 2005

(86) PCT No.: PCT/FR2005/000372
§ 371 (c)(1), (2), (4) Date: Jan. 10, 2007

(87) PCT Pub. No.: WO2005/089974
PCT Pub. Date: Sep. 29, 2005

(65) Prior Publication Data
US 2007/0186614 A1 Aug. 16, 2007

(30) Foreign Application Priority Data
Feb. 19, 2004 (FR) .................................. 04 01688

(51) Int. Cl.
*B29C 55/02* (2006.01)

(52) U.S. Cl. .................................... 264/153; 156/272.6
(58) Field of Classification Search .................... 72/347; 220/62.11, 62.22; 156/73.6, 272.6; 264/153, 264/259, 80, 483, 265, 320
See application file for complete search history.

(56) References Cited

U.S. PATENT DOCUMENTS

| | | | | |
|---|---|---|---|---|
| 4,143,790 A * | 3/1979 | Ueno et al. | | 220/62.13 |
| 4,354,370 A * | 10/1982 | Ullman, Jr. | | 72/42 |
| 4,644,626 A * | 2/1987 | Barnes et al. | | 29/421.1 |
| 5,329,799 A * | 7/1994 | Ito et al. | | 72/340 |
| 5,590,558 A * | 1/1997 | Saunders et al. | | 72/347 |
| 5,653,357 A * | 8/1997 | Miyazawa et al. | | 220/62.11 |
| 5,686,194 A * | 11/1997 | Shimizu et al. | | 428/626 |
| 5,882,784 A | 3/1999 | Sumiya et al. | | |
| 5,901,601 A * | 5/1999 | Fujimoto et al. | | 72/389.1 |
| 6,205,831 B1 * | 3/2001 | Adey et al. | | 72/47 |
| 6,253,588 B1 * | 7/2001 | Rashid et al. | | 72/57 |

FOREIGN PATENT DOCUMENTS

| | | |
|---|---|---|
| EP | 0 648 600 | 4/1995 |
| EP | 1 316 414 | 6/2003 |
| EP | 1 342 650 | 9/2003 |
| JP | 6-218875 | 8/1994 |

OTHER PUBLICATIONS

Kenji et al., Machine translation of JP 06218875, Detailed Description pp. 1-10.*

* cited by examiner

*Primary Examiner* — Richard Crispino
*Assistant Examiner* — Daniel McNally
(74) *Attorney, Agent, or Firm* — Oblon, Spivak, McClelland, Maier & Neustadt, L.L.P.

(57) ABSTRACT

The subject of the invention is a method for fabricating a composite laminate part, consisting in coating a steel sheet of which the thickness is less than 0.65 mm, with an adhesive polymer film of which the thickness is at least 0.1 mm, in order to form a composite laminate steel sheet, and then forming this composite laminate sheet by drawing in order to obtain said composite part.

16 Claims, 1 Drawing Sheet

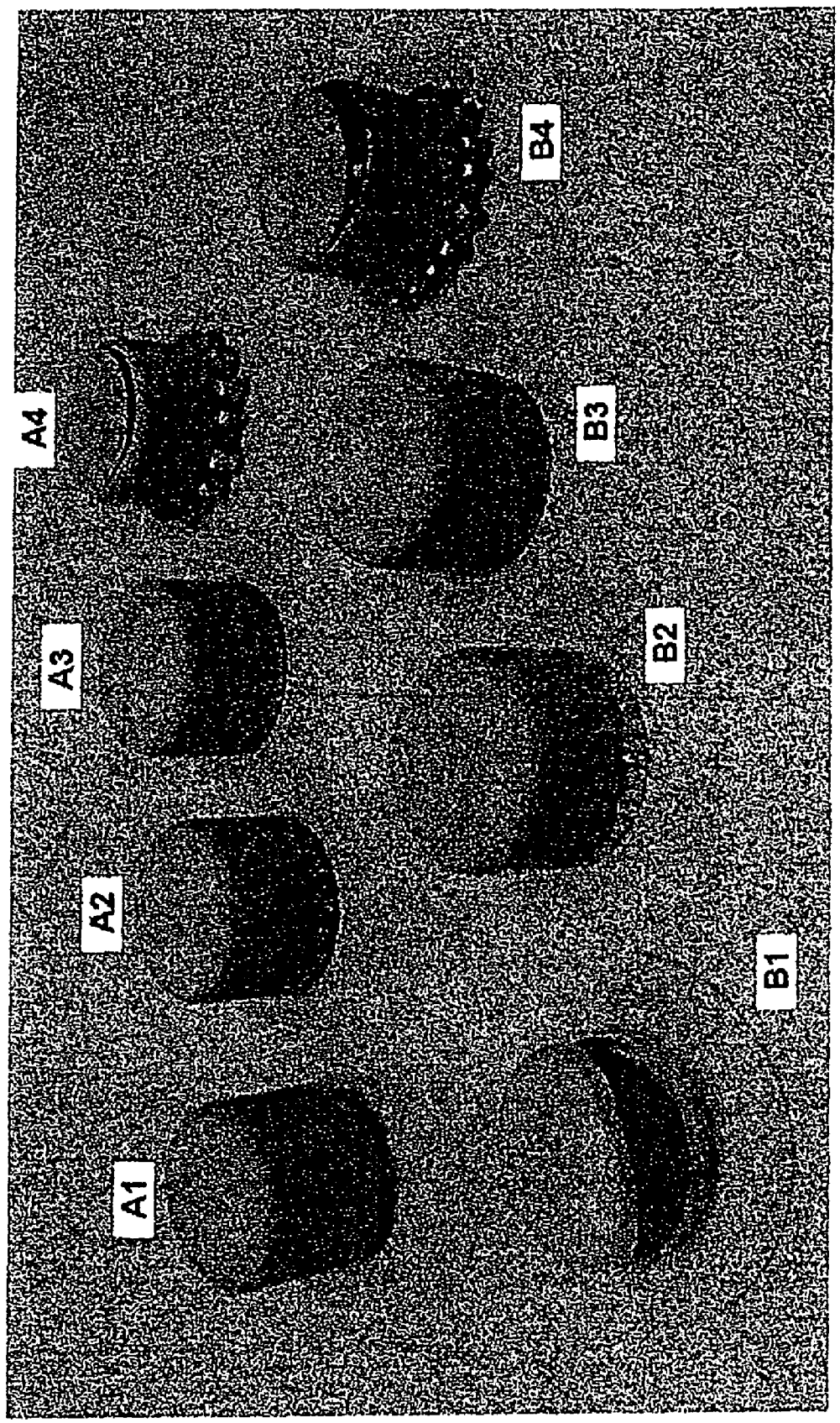

METHOD FOR PRODUCING A COMPOSITE PART

BACKGROUND OF THE INVENTION

The present invention relates to a method for fabricating a composite laminate part, the parts obtained using this method, and the use of these parts in the automotive field to produce vehicle bodies, in the fields of domestic electrical appliances, industry in general and the building trade.

The new legislation enacted to reduce carbon dioxide emissions are forcing motor vehicle manufacturers to reduce the weight of motor vehicles in order to lower their fuel consumption.

DESCRIPTION OF THE PRIOR ART

Despite progress achieved by the steel industry to develop steel grades having both good strength and good ductility, making it possible to substantially reduce sheet thickness, sheets still have thicknesses above 0.65 mm for large parts, that is, parts for which the sheet or sheet blank used to make them has at least one of its dimensions higher than 600 mm. In consequence, the weight of this type of part still remains higher than the manufacturers' requirements. In fact, the fabrication of skin parts, that is, visible parts like fenders, for example, by drawing a steel sheet having a thickness of less than 0.65 mm, is unfeasible because it is very difficult to control on an industrial installation, particularly due to the risks of formation of folds or tears on the drawn part.

During drawing, the steel sheet is held in place by blank holders between a die and a punch, which often have complex shapes. Thus, some areas of the sheet are stretched, while others, on the contrary, are compressed.

Conventionally, when the sheet has a thickness of greater 0.65 mm, the drawing tools are set so that the distance between the punch and the die, which a person skilled in the art conventionally calls the "material passage", is equal to or higher than the thickness of the sheet to be drawn. Operations proceed under these conditions, with a positive clearance between tools. It is customary to use a margin equivalent to a few percent of the sheet thickness, with the aim to tolerate the thickness variations that may exist for such sheets, and also to facilitate the flow of material in the necking areas of the part, that is, where the sheet will have a tendency to thicken during the forming operation. This avoids the risk of pinching between the tools, which can cause tears. At this thickness level, the steel has a sufficient deformation capacity to offset the differences in clearance which appear during the drawing and prevent the formation of folds and/or tears.

On the other hand, if the sheet thickness is between 0.50 and 0.65 mm, the steel becomes vulnerable to differences in clearance between tools, and is no longer capable of offsetting these differences in clearance. In consequence, folds and tears occur. If, during the drawing of such sheets, the custom of setting the tools with a positive clearance is preserved, the tears can be avoided. However, the formation of folds is inevitable, and this is unacceptable especially for skin parts.

The drawing of a sheet having a thickness of less than 0.50 mm to form a part of a complex shape not having any folds is indeed impossible, because of the difficulty of finding an operating point of the drawing tools without the risk of tearing.

Thus, to reduce the weight of the vehicles, the manufacturers have turned toward low density materials such as aluminum and thermoplastic polymers to produce this type of part. In the case of thermoplastic polymers, their use makes the parts about 50% lighter than the same type of steel part, and also provides great freedom of shape. Moreover, thermoplastic polymer parts have excellent tolerance to minor impacts.

However, thermoplastic polymers have drawbacks such as:
  problems of electrical conductivity which make their use incompatible with conventional painting processes such as cataphoresis,
  difficulties in obtaining a part of which the color is the same as that of the surrounding parts which are generally made from steel, and
  assembly problems associated with the differential expansion of the thermoplastic polymer part with respect to the surrounding parts during the heating cycles of the painting operation, and during the life of the vehicle.

Sandwich sheets are also known, composed of two outer steel sheet facings and a polymer core connecting the two facings, which make the sheets about 20 to 30% lighter than a steel sheet having the same mechanical properties. However, on the one hand, the saving in weight is deemed insufficient by automotive manufacturers, and on the other, the fabrication of this type of sheet is problematic. In fact, it is difficult to make the polymer coat adhere uniformly between the two facings, and the sandwich sheet is liable to delaminate while it is being formed.

In the fields of domestic electrical appliances and industry in general, manufacturers are also subject to lightening requirements to increase productivity. Hence, the same problem is encountered as in the automotive field during the forming of thin sheets or sheet blanks by drawing to obtain parts with a satisfactory appearance.

SUMMARY OF THE INVENTION

It is therefore the object of the present invention to avoid the formation of folds and/or tears on steel parts obtained by forming steel sheets or sheet blanks having a thickness of less than 0.65 mm.

For this purpose, the primary subject of the invention is a method for fabricating a composite laminate part comprising the steps consisting in:
  coating at least one side of a steel sheet of which the thickness $E_a$ is less than 0.65 mm with one or more adhesive polymer films of which the total thickness $E_p$ is equal to or greater than 0.1 mm to form a composite laminate steel sheet having a thickness E, according to which $E=E_a+E_p$,
  optionally, cutting said sheet to form a blank, and then
  forming the composite laminate sheet or sheet blank by drawing to obtain said composite part, the drawing being carried out in a drawing tool comprising a punch, a die and a blank holder, by adjusting the value of the material passage Pm between the punch and the die, so that:

$$E - 0.80 \times E_p \leq Pm \leq E.$$

The method according to the invention may also have the following features:
  the composite laminate sheet or sheet blank is drawn by applying the punch directly to the side of the sheet or the sheet blank that is coated with the adhesive polymer film, or else the composite laminate sheet or sheet blank is drawn by applying the punch directly to the side of the sheet or the sheet blank that is not coated with the adhesive polymer film,
  the thickness $E_a$ of the steel sheet is less than 0.5 mm,
  the thickness $E_p$ of the adhesive polymer film is greater than 0.2 mm, the total thickness E of the composite laminate steel sheet is between 0.3 and 1.2 mm, the polymer film is directly extruded onto the sheet, the polymer film is formed beforehand, before being applied to the steel sheet by hot lamination or by bonding using an adhesive, the polymer of the adhesive film is a thermoplastic polymer selected from polyolefins, polyesters, polyamides and blends thereof, in order to improve the adhesion of the polymer film to the steel sheet, the polymer is functionalized by grafting with a carboxylic acid or a derivative thereof and/or before the polymer film is applied to the steel sheet, it undergoes a corona discharge or flame treatment and/or the steel sheet is subjected to a prior surface treatment to improve the adhesion of the polymer film to the sheet.

A second subject of the invention is a part which can be obtained by the fabrication method described above.

The steel sheet used to fabricate the composite laminate part according to the invention has a thickness $E_a$ that is greater than 0.1 and less than 0.65 mm, preferably less than 0.5 mm and advantageously lower than 0.4 mm.

In fact, below 0.1 mm, the stiffness of the composite laminate part is insufficient, and above 0.65 mm, the economy in weight of the part is insufficient.

In general, the sheets used to fabricate external automotive body parts, including linings of opening elements or parts for domestic electrical appliances, are more than 600 mm wide, and the sheet blanks have at least one dimension greater than 600 mm.

The steel grade used mainly depends on the intended applications. For example, if the composite laminate part is used for the fabrication of motor vehicles, the steel grades typically used are the Dual Phase grades, grades ES (EN DC 01 to DC06), grades HLE (EN H 240 LA to H 40 LA) or grades IF P220 or P235.

The steel sheet may or may not be precoated. Preferably, to improve its properties, it is precoated on at least one of its sides with a metal coating, based for example on pure zinc or a zinc alloy, or with a thin (about 1 μm) organic coating of the dry lubrication film type, anticorrosion primer, finishing lacquer or bonding primer. It may also have undergone a chromating or phosphating treatment, or may have been coated with an oil film.

The adhesive polymer film has a thickness $E_p$ equal to or greater than 0.1 mm, and preferably greater than 0.2 mm.

Below 0.1 mm, the part is liable to be rapidly damaged during its fabrication, first by tearing of the precoat, and then by fracture of the part. Above 0.2 mm, the weight saving of the part begins to be appreciable, because the thicker the polymer, the thinner the sheet can be made.

The polymer is selected according to the final use of the part, but in any case it must have the following characteristics:

a high level of adhesion to the steel sheet to, on the one hand, in order to avoid problems of the delamination type during forming of the composite laminate sheet blank and, on the other, to guarantee good corrosion resistance, and a sufficient level of ductility to avoid penalizing the formability characteristics of the composite laminate sheet.

Finally, according to the intended use of the composite laminate part, the polymer will have additional characteristics.

Thus, in the automotive and domestic electrical appliance fields, the polymer may also have vibroacoustic damping properties.

In the automotive field, it is also preferable for the polymer to have good high temperature mechanical strength to guarantee the surface appearance and geometric precision of the part, even after having undergone a severe heat treatment such as, for example, during its painting by cataphoresis. In fact, cataphoresis involves the exposure of the part to temperatures of between 140 and 200° C. for 15 to 30 minutes, in order to bake the paint coat.

The polymer is a thermoplastic polymer selected from polyolefins like, for example, polyethylene and polypropylene, polyesters such as, for example, polyethylene terephthalate, polyamides and blends thereof.

To improve the adhesion of the polymer film to the steel sheet, the polymer is preferably functionalized by grafting using a carboxylic acid or a derivative thereof. It may also comprise a copolymer of styrene and carboxylic acid or a derivative thereof, or a very small quantity of epoxy resin. Before the polymer film is applied to the sheet, it may also undergo a corona discharge or flame treatment. The sheet may also be subjected to a prior surface treatment, such as chromating, phosphating or any other surface treatment without chromium VI.

The polymer may also contain compounds well known to a person skilled in the art for further improving its properties, for example, additives such as antistatic agents, pigments, dyes and antioxidants, to prevent the thermo-oxidation that may take place during paint baking cycles.

Furthermore, the characteristics of use of the polymer can be improved by incorporating small quantities of lubricants or slip agents.

The film may comprise one or more layers of polymer, of which the total thickness $E_p$ is equal to or greater than 0.1 mm, like for example a coextruded two-layer film comprising a first 50 μm thick adhesive layer consisting of maleic anhydride grafted polypropylene, and a second 350 μm thick layer of polypropylene.

To fabricate a composite laminate steel sheet, one or more polymer films are applied to the entire surface, or to only part of at least one side of the steel sheet by hot lamination or by bonding using an adhesive.

Preferably, the steel sheet is preheated to ensure better adhesion of the polymer film to the steel sheet.

The polymer film is previously formed, for example by extrusion, and then applied to the steel sheet or directly extruded on the sheet.

In general, the total thickness E of the composite laminate steel sheet is between 0.3 and 1.2 mm.

In fact, using a composite laminate steel sheet of thickness E lower than 0.3 mm, it is not possible to fabricate parts having sufficient stiffness for industrial application. On the other hand, above 1.2 mm, the weight saving of the part is insufficient.

After having fabricated the composite laminate sheet, it is still possible to reinforce it locally by applying steel sheet blanks to the adhesive polymer film, in order to form patchwork sheets.

When the composite laminate steel sheet has been fabricated, it is either formed directly in tools called "follow-up tools", which means that the sheet initially in the form of a coil is unwound and then directly engaged between the tools which then carry out all or part of the cutouts of the part at the same time as certain forming steps, or it is cut out to form blanks which are suitable for subsequent forming.

The composite laminate sheet or sheet blank is formed by drawing in a drawing tool conventionally comprising a punch, a die and a blank holder.

After having fixed the sheet or blank in the blank holder, the material passage Pm between the punch and the die is adjusted so that the material passage Pm, limits included, is comprised between the thickness E of the composite laminate sheet or sheet blank, stripped of 80% of the total thickness $E_p$ of the adhesive polymer film or films, and the thickness E of the composite laminate sheet or sheet blank E, that is:

$$E-0.80 \times E_p \leq Pm \leq E.$$

This adjustment serves to obtain a part without any folds or tears. This is because the capacity of the polymer to be compressed and deformed is greater than that of the steel.

After having adjusted the material passage Pm between the punch and die, the sheet or blank is drawn by applying the punch either to the side of the sheet or of the blank coated with the adhesive polymer film, or to the side not coated with this film.

As we shall show in the examples below, the polymer film applied to the sheet or sheet blank serves to reduce the thickness of the sheet which is to be formed, due to the ability of the polymer to be compressed and deformed. Thus, the polymer serves to maintain a constant and uniform pressure and contact between the punch, the sheet or blank, and the die by flowing sacrificially. The necking areas in the composite laminate sheet or sheet blank, which, in the specific case of a monolithic steel sheet, become more critical as the thickness of the sheet decreases, are proportionally more offset and stabilized as the polymer film thickness increases for a given sheet thickness. In consequence, the formation of folds in the part, the deterioration of the precoat, and/or the breakage of the part, are significantly reduced, or completely eliminated.

The inventors have thus demonstrated that if the material passage Pm is set at a value higher than the thickness E of the composite laminate sheet or sheet blank, folds begin to form in the part as the punch deforms the sheet or sheet blank coated with the adhesive polymer film or films, and the folds vary directly with the value of Pm.

On the other hand, if the material passage Pm is set at a value lower than $E-0.80 \times E_p$, the part is liable to tear, due to the excessive friction between the die, the punch and the composite laminate sheet or sheet blank. In the case in which the composite laminate sheet or sheet blank is precoated, for example with a zinc precoat, this precoat will be damaged, and then, as the stresses increase, the steel sheet or sheet blank will tear due to the excessive compression of the adhesive polymer film or films.

The parts obtained can be used in various fields in which a weight saving may be desirable, as for example in the automotive field for the fabrication of fenders, in domestic electrical appliances for the fabrication of washing machine bodies, and in industry in general.

Depending on the application for which the composite laminate part is intended, it may be coated with an adhesive polymer film on one side or on both sides of this steel sheet.

For example, a part for domestic electrical appliance fabrication may advantageously be coated on both sides with an adhesive polymer film, the type of polymer being identical or different, in order to impart a satisfactory surface appearance to the visible side of the part.

A steel sheet coated with an adhesive polymer film can therefore be used to fabricate parts offering a weight saving of about 30 to 50% compared with a monolithic steel part, and with a limited loss of stiffness of the part formed.

Such a composite laminate sheet has the further advantage of not being marked during the handling of said sheet, due to its elasticity.

The composite laminate part of the invention also has, at equivalent part thickness, better resistance to small impacts than that of a monolithic steel part or even a monolithic polymer part. This feature is particularly advantageous for motor vehicle manufacturers for skin parts such as fenders or opening elements, for example, which regularly sustain low intensity impacts.

The expression part resistant to small impacts means a part which deforms under the action of an impact, and recovers its initial shape without any residual marking. For a given part geometry, each material, according to its mechanical behavior and its thickness, has a blister energy above which, following an impact, the part is substantially marked, without the ability to recover its initial shape.

Considering that the marking of a part is only visible from a residual deformation of 0.25 mm, the inventors have thus demonstrated that the irreversible marking of a monolithic part of DP 500 grade steel and thickness 0.75 mm occurs with an impact having an energy of 2.28 J, whereas the irreversible marking of a part of DP 500 grade steel and thickness 0.5 mm, coated with a 0.25 mm thick polypropylene film, only occurs from an impact having an energy of 4.73 J. These values should be considered without the DP 500 steel having undergone bake-hardening. If this were the case, the marking of the part would only have begun from an impact with an energy higher than the level previously mentioned.

The invention will now be illustrated by examples provided for guidance, and nonlimiting, with reference to the single FIGURE appended hereto.

BRIEF DESCRIPTION OF THE DRAWING

1. Characterization in Drawing

The single FIGURE illustrates the results of drawing tests conducted on various steel sheet blanks coated with an adhesive polymer film according to the invention (buckets A1 to A4) or not coated (buckets B1 to B4).

For this purpose, a steel sheet was fabricated, of grade DP 500, thickness 0.5 mm precoated on each of its sides with a zinc coating carried out by electrogalvanization.

A coextruded polymer film based on maleic-anhydride-grafted polypropylene and polypropylene, 0.25 mm thick, was then applied by colamination to one of the sides of part of the sheet.

Blanks of 64 mm diameter were then cut out of the sheet coated with the polymer film according to the invention and from the uncoated sheet. A 0.025 mm thick Teflon film was applied to both sides of each of the blanks to eliminate any risk of friction on the tools.

The two series of blanks were then subjected to a controlled deformation test using a drawing press comprising a punch, a die and a blank holder, to form 33 mm diameter swift buckets by applying a clamping force of 10 kN to the blank holder.

To demonstrate that the drawing of 0.5 mm thick steel sheets is easier when they are coated with a polymer film, the inventors varied the material passage between the punch and die, that is, the clearance between the tools. In fact, conventional drawing presses are not ideally suited to the drawing of large sheet blanks, that is to say sheet blanks having at least one dimension greater than 600 mm, whether laminated or not, having a thickness of less than 0.65 mm.

To understand the principle of the drawing test performed to illustrate the invention, we shall consider a monolithic steel sheet of thickness E with a zinc precoat. For this sheet, we define various areas between the die and punch, according to the necking of the steel:

if the distance between the die and the punch is equal to E, we are in the ideal case in which the clearance between the steel sheet and the drawing tools is nonexistent. This serves to obtain a perfect part without folds or tears, if the distance between the die and the punch is greater than E, folds begin to form in the steel sheet as the punch deforms the sheet, and these folds vary directly with the clearance, and if the distance between the die and the punch is less than E, the friction between the tools and the steel sheet varies inversely with the distance. Initially, the precoat is damaged, and then, as the stress is increased, the steel sheet tears.

The results of drawing blanks according to the distance between the die and the punch are assembled in the table below, with the buckets obtained rated as follows:

rating 1; well-formed bucket, without fold or tear of the zinc precoat rating 2; well-formed bucket, but tearing of the zinc precoat rating 3; formation of folds and incipient breakage of the bucket rating 4; breakage of the bucket and/or intense formation of folds.

For each of the buckets formed, the rating is recorded according to the distance between the drawing tools (referred to as "material passage"), which is expressed according to the thickness of the sheet blank, laminated or not, plus the clearance between the blank and the drawing tools.

The blanks A denote blanks, of thickness 0.75 mm, cut out from a steel sheet coated with polymer film according to the invention. The blanks B, of thickness 0.5 mm, serving for comparison, denote blanks cut out from the same steel sheet not coated with polymer.

To clearly understand how Table 1 below should be read, we shall consider the blank A for which the thickness is 0.75 mm, with a clearance of 0.1 mm between the blank and the drawing tools, corresponding to the formation of the bucket A4. The value, placed in brackets in the table, of the thickness of the blank +0.1 mm is hence 0.85 mm, and the rating recorded is 3.

TABLE 1

Test Results

| Product: | blank thickness −0.2 mm (value) | blank thickness −0.1 mm (value) | blank thickness (value) | blank thickness +0.1 mm (value) |
|---|---|---|---|---|
| Blanks A according to the invention | bucket A1 1 (0.55 mm) | bucket A2 1 (0.65 mm) | bucket A3 1 (0.75 mm) | bucket A4 3 (0.85 mm) |
| Blanks B (comparative) | bucket B1 4 (0.3 mm) | bucket B2 2 (0.4 mm) | bucket B3 1 (0.5 mm) | bucket B4 4 (0.6 mm) |

The inventors have shown that the presence of an adhesive polymer film on a steel sheet serves to extend the operating range of such a tool, by further procuring a negative clearance compensation mechanism, due to the aptitude to compression of the polymer, which is higher than that of the steel, and also due to the high formability of the polymer. By flowing sacrificially, the polymer initially serves to preserve the zinc precoat, and then to considerably delay any incipient breakage in the part.

2. Characterization of Small Impacts

The characterization of small impacts was carried out on parts having the general shape of a 30 mm deep cup. These parts are made by shallow drawing, from the following monolithic steel or composite laminate sheets:

part A: monolithic DP 500 grade steel sheet, thickness 0.5 mm, not having undergone bake-hardening, part B: DP 500 grade steel sheet, thickness 0.75 mm, not having undergone bake-hardening, part C: DP 500 grade steel sheet, thickness 0.5 mm, not having undergone bake-hardening, coated on only one side with a 0.25 mm thick polypropylene film, part D: DP 500 grade steel sheet, thickness 0.5 mm, not having undergone bake-hardening, coated on only one side with a 0.5 mm thick polypropylene film.

To evaluate the residual deformation of the part after a small impact, a mobile element with a variable weight is dropped onto it, with a drop height and speed which are also variable, in order to vary the impact energy of the element on the part.

Thus a mobile element having the general shape of a hemisphere, made of aluminum, with a diameter of 85 mm, coated with a 6.5 mm thick rubber layer, is dropped onto the part.

After the impact of the mobile element on the part, the residual marking of the part is observed and measured, that is, the depth of the mark left by the element when it drops onto the part. The test results are assembled in Table 2.

TABLE 2

Results of Small Impact Tests

| Impact Energy (J) | Residual marking of the part (mm) | | | |
|---|---|---|---|---|
| | Part A | Part B | Part C* | Part D* |
| 1.49 | n.m. | 0.2 | n.m. | n.m. |
| 2.28 | 0.12 | 0.3 | n.m. | n.m. |
| 2.77 | 0.16 | n.m. | n.m. | n.m. |
| 3.26 | 0.17 | 0.4 | 0.18 | n.m. |
| 3.75 | 0.20 | n.m. | 0.20 | n.m. |
| 4.05 | 2.15 | 0.5 | n.m. | n.m. |
| 4.24 | 6.43 | n.m. | 0.20 | 0.13 |
| 4.54 | n.m. | n.m. | 0.22 | n.m. |
| 4.73 | 9.2 | n.m. | 7 | n.m. |
| 5.03 | n.m. | n.m. | n.m. | 0.13 |
| 5.22 | n.m. | n.m. | n.m. | 7.2 |

*invention
n.m.: not measured

The marking of the part is visible when the depth of impact is greater than 0.25 mm. Although part B is stiffer than part D, a lower energy impact is sufficient to mark part B than to mark part D. Thus, the inventors have demonstrated that the addition of a polymer film to the steel sheet significantly improves the resistance to small impacts of the parts according to the invention.

The invention claimed is:

1. A method for fabricating a composite laminate automotive part, comprising:

coating at least one side of a steel sheet, of which a thickness $E_a$ is less than 0.65 mm with one or more adhesive polymer films of which a total thickness $E_p$ is equal to or greater than 0.1 mm, to form a composite laminate steel sheet having a total thickness E, according to which $E=E_a+E_p$, and forming by initially drawing the composite laminate sheet to obtain said composite laminate automotive part, the drawing being carried out in a drawing tool comprising a punch, a die, and a blank holder, by adjusting a value of the material passage Pm between the punch and the die, so that:

$E - 0.80 \times E_p \leq Pm < E.$

2. The method as claimed in claim 1, wherein the polymer of the adhesive film is a thermoplastic polymer.

3. The method as claimed in claim 2, wherein the thermoplastic polymer is selected from polyolefins, polyesters, polyamides, and blends thereof.

4. The method as claimed in claim 2, wherein the polymer is functionalized by grafting with a carboxylic acid or a derivative thereof.

5. The method as claimed in claim 1, further comprising:
after the coating and before the forming, cutting said sheet to form a sheet blank.

6. The method as claimed in claim 5, wherein the sheet blank has at least one dimension greater than 600 mm.

7. The method as claimed in claim 1, wherein the composite laminate sheet is drawn by applying the punch directly to the side of the sheet that is coated with the adhesive polymer film.

8. The method as claimed in claim 1, wherein the composite laminate sheet is drawn by applying the punch directly to the side of the sheet that is not coated with the adhesive polymer film.

9. The method as claimed in claim 1, wherein the thickness $E_a$ of the steel sheet is less than 0.5 mm.

10. The method as claimed in claim 1, wherein the total thickness $E_p$ of the adhesive polymer film is greater than 0.2 mm.

11. The method as claimed in claim 1, wherein the total thickness E of the composite laminate steel sheet is between 0.3 and 1.2 mm.

12. The method as claimed in claim 1, wherein the polymer film is directly extruded onto the sheet.

13. The method as claimed in claim 1, wherein the polymer film is formed before being applied to the steel sheet by hot lamination or by bonding using an adhesive.

14. The method as claimed in claim 1, wherein, before the polymer film is applied to the steel sheet, it undergoes a corona discharge or flame treatment.

15. The method as claimed in claim 1, wherein the steel sheet is subjected to a prior surface treatment to improve the adhesion of the polymer film to the sheet.

16. The method as claimed in claim 1, wherein the composite laminate automotive part is an external automotive body part.

* * * * *